United States Patent
Yamada et al.

(10) Patent No.: US 6,240,354 B1
(45) Date of Patent: May 29, 2001

(54) INTERNAL COMBUSTION ENGINE CONTROL APPARATUS

(75) Inventors: Yoshihisa Yamada, Shizuoka-ken; Katsuyuki Yamaguchi, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/345,752

(22) Filed: Jul. 1, 1999

(30) Foreign Application Priority Data

Aug. 6, 1998 (JP) .................................................. 10-222790

(51) Int. Cl.[7] .............................. G06F 7/70; G06F 19/00
(52) U.S. Cl. .............................. 701/70; 701/84; 701/87; 123/436; 303/140
(58) Field of Search .................................. 701/70, 72, 82, 701/84, 85, 86, 87; 180/197; 123/478, 436, 568.11; 303/140, 146

(56) References Cited

U.S. PATENT DOCUMENTS

| 5,265,575 | * | 11/1993 | Norota | 123/436 |
| 5,309,362 | * | 5/1994 | Ito et al. | 701/84 |
| 5,479,898 | * | 1/1996 | Cullen et al. | 123/350 |
| 5,559,703 | * | 9/1996 | Iwata et al. | 701/86 |
| 5,875,757 | * | 3/1999 | Mizuno | 123/295 |
| 5,927,421 | * | 7/1999 | Fukada | 180/197 |

FOREIGN PATENT DOCUMENTS

| 3-14757 | 1/1991 | (JP) . |
| 3-114969 | 5/1991 | (JP) . |
| 3-164540 | 7/1991 | (JP) . |
| 8-175366 | 7/1996 | (JP) . |
| 9-158752 | 6/1997 | (JP) . |

* cited by examiner

Primary Examiner—William A. Cuchlinski, Jr.
Assistant Examiner—Gertrude Arthur
(74) Attorney, Agent, or Firm—Oliff & Berridge, PLC (57) ABSTRACT

An internal combustion engine control apparatus is capable of changing between a stratified charge combustion operation and a uniform combustion operation in accordance with the operating condition of an internal combustion engine. If a request for a reduction in the torque of the engine is issued in order to reduce the behavior change of the vehicle or the like, the torque of the engine can be reduced with high responsiveness and high precision by immediately changing the operation of the engine to the stratified charge combustion operation, and then controlling at least one of the amount of fuel to be injected and the fuel injection timing.

22 Claims, 7 Drawing Sheets

INTERNAL COMBUSTION ENGINE CONTROL APPARATUS

INCORPORATION BY REFERENCE

The disclose of Japanese Patent Application No. HEI 10-222790 filed on Aug. 6, 1998, including the specification, drawings and abstract, is incorporated herein by reference in its entirety.

BACKGROUND OF THE INVENTION

1. Field of the Invention

The present invention relates to a technology for controlling the torque of an internal combustion engine so as to reduce behavioral changes and the like of a vehicle.

2. Description of the Related Art

The development of technologies for stabilizing the behavior of a vehicle by controlling at least one of the torque produced by an internal combustion engine and the braking force produced by a brake device in accordance with the behavior of the vehicle during acceleration, a turn and the like has been lately pursued.

One example of such technology is a vehicular acceleration slip control apparatus disclosed in Japanese Patent Application Laid-open No. HEI 8-175366. The acceleration slip control apparatus performs engine torque control and braking control in response to occurrence of an acceleration slip of a drive wheel. Upon detecting discontinuation of the engine torque control during execution of the engine torque control and the braking control in response to a drive wheel acceleration slip, the control apparatus calculates an engine torque control value at the time of the discontinuation of the engine torque control. The control apparatus then converts the calculated engine torque control value into a braking hydraulic pressure correction value, and corrects the braking hydraulic pressure on the drive wheel by using the converted braking hydraulic pressure correction amount to reduce the acceleration slip.

As an example of the engine torque control method employed in behavior stabilizing technologies as mentioned above, a method adopting control of the throttle valve opening is disclosed in Japanese Patent Application Laid-open No. HEI 9-158752. Upon an engine torque reduction request, the method corrects the throttle valve opening in the closing direction to reduce the intake air flow into the internal combustion engine to reduce the engine torque.

However, the control of the engine torque through adjustment of the throttle valve opening has the following problems in control responsiveness. That is, there exists a time lag between start of control of the throttle valve and actual establishment of a desired opening of the throttle valve. A certain length of time is also required between the establishment of the desired throttle valve opening and attainment of operation of the internal combustion engine based on the intake air flow in accordance with the established throttle valve opening. Therefore, adjustment of the throttle valve opening cannot easily control the engine torque with good responsiveness.

Moreover, if a butterfly-type throttle valve is employed, the precision in the engine torque control decreases. Due to the mechanism of the butterfly-type throttle valve, the changing rate of the intake passage sectional area increases as the valve opening decreases. Therefore, if the opening of the butterfly-type throttle valve is small, it is difficult to perform fine and precise adjustment of the intake air flow. Accordingly, the engine torque control precision decreases.

Cylinder injection-type internal combustion engines having fuel injection valves for injecting fuel directly into the cylinders have lately been developed in which the operation of the engine can be changed between a stratified charge combustion operation and a uniform combustion operation by controlling the amount of fuel to be injected, the fuel injecting timing, and the like in accordance with the engine operating condition. In such internal combustion engines, the throttle valve is maintained in a substantially fully open state over most operation ranges excluding a very low load operating range in order to reduce the drive force loss caused by the intake air pumping. Therefore, if the control of the engine torque through adjustment of the throttle valve opening is performed in such an engine, the combustion condition becomes unstable to that torque fluctuation, misfire or the like may result.

SUMMARY OF THE INVENTION

Accordingly, it is an object of the present invention to provide a technology capable of performing engine torque control with high responsiveness and high precision while preventing deterioration of the combustion condition in an internal combustion engine, such as a cylinder injection-type engine, which is able to change between stratified charge combustion and uniform combustion In accordance with one aspect of the invention, an internal combustion engine control apparatus includes an internal combustion engine that allows an operation of the internal combustion engine to be changed between a stratified charge combustion operation and a uniform combustion operation in accordance with an opening condition. The internal combustion engine control apparatus includes an engine operation changing device for changing the operation of the internal combustion engine to the stratified charge combustion operation if a torque reduction request for a reduction in torque of the internal combustion engine occurs.

In this internal combustion engine control apparatus, if the request for a reduction in the torque of the internal combustion engine occurs, the engine operation changing device changes the combustion mode of the internal combustion engine to stratified charge combustion.

During the stratified charge combustion operation, the torque of the internal combustion engine is controlled mainly through fuel injection control. Therefore, when the combustion mode of the engine is changed to stratified charge combustion by the engine operation changing device, the torque control related to the torque reduction request is performed through the fuel injection control. In a cylinder injection type internal combustion engine, for example, the fuel injection control is immediately reflected in the operation of the engine. Consequently, torque control with high responsiveness and high precision can be achieved.

The control apparatus according to the invention may further include an engine torque control device for adjusting the torque of the internal combustion engine by changing at least one of an amount of fuel to be injected and a fuel injection timing if the operation of the internal combustion engine is changed to the stratified charge combustion operation by the engine operation.

In accordance with another aspect of the invention, an internal combustion engine control apparatus includes an internal combustion engine that allows an operation of the internal combustion engine to be changed between a stratified charge combustion operation and a uniform combustion operation in accordance with an operating condition. The control apparatus also includes a behavior change detecting device for detecting a change in behavior of a vehicle equipped with the internal combustion engine. If a change in the behavior is detected by the behavior change detecting device, a torque reduction request device outputs a torque reduction request for a reduction in torque of the internal combustion engine in order to reduce the change in the behavior. An engine operation changing device changes the operation of the internal combustion engine to the stratified charge combustion operation if the torque reduction request is outputted by the torque reduction request device.

This internal combustion engine control apparatus changes the operation of the internal combustion engine to the stratified charge combustion operation if the behavior of the vehicle changes. The torque control of the internal combustion engine is performed mainly through fuel injection control. Therefore, the torque control with high responsiveness and high precision can be achieved. As a result, the vehicle behavior change is reduced in an early period.

The internal combustion engine control apparatus may further include an engine torque control device for adjusting the torque of the internal combustion engine by changing at least one of an amount of fuel to be injected and a fuel injection timing if the operation of the internal combustion engine is changed to the stratified charge combustion operation by the engine operation.

The internal combustion engine control apparatus may further include a behavior change predicting device for predicting a change in the behavior of the vehicle. If a change in the behavior of the vehicle is predicted by the behavior change predicting device, the torque reduction request device outputs the torque reduction request. If the torque reduction request is outputted by the torque reduction request device, the engine operation changing device changes the operation of the internal combustion engine to the stratified charge combustion operation.

This construction makes it possible to change the operation of the internal combustion engine to the stratified charge combustion operation before the vehicle behavior actually changes. Therefore, the torque control can be immediately realized through fuel injection control at the time point when the vehicle behavior actually changes. Hence, a change in the vehicle behavior can be reduced more quickly.

BRIEF DESCRIPTION OF THE DRAWINGS

The foregoing and further objects, features and advantages of the present invention will become apparent from the following description of a preferred embodiment will reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

Figure 1:
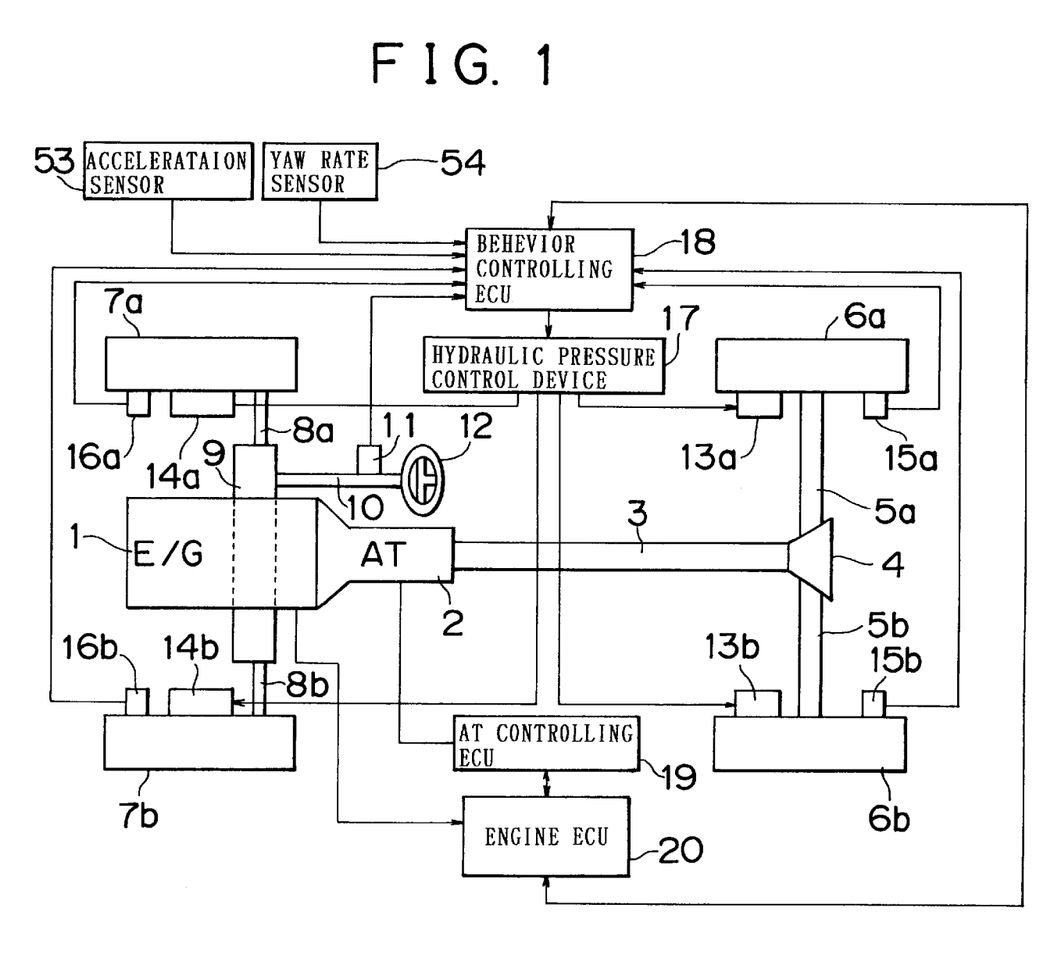
FIG. 1 is a schematic illustration of the construction a vehicle to which the invention is applied.

FIG. 1 is a schematic illustration of the construction of a vehicle to which an internal combustion engine control apparatus according to the invention is applied. A vehicle represented in FIG. 1 has an internal combustion engine 1 and an automatic transmission 2 connected to the engine 1. The vehicle is a rear wheel drive vehicle wherein output of the automatic transmission 2 is transmitted to right and left rear wheels 6a,6b via a propeller shaft 3, a differential gear 4 and drive shafts 5a,5b.

Figure 2:
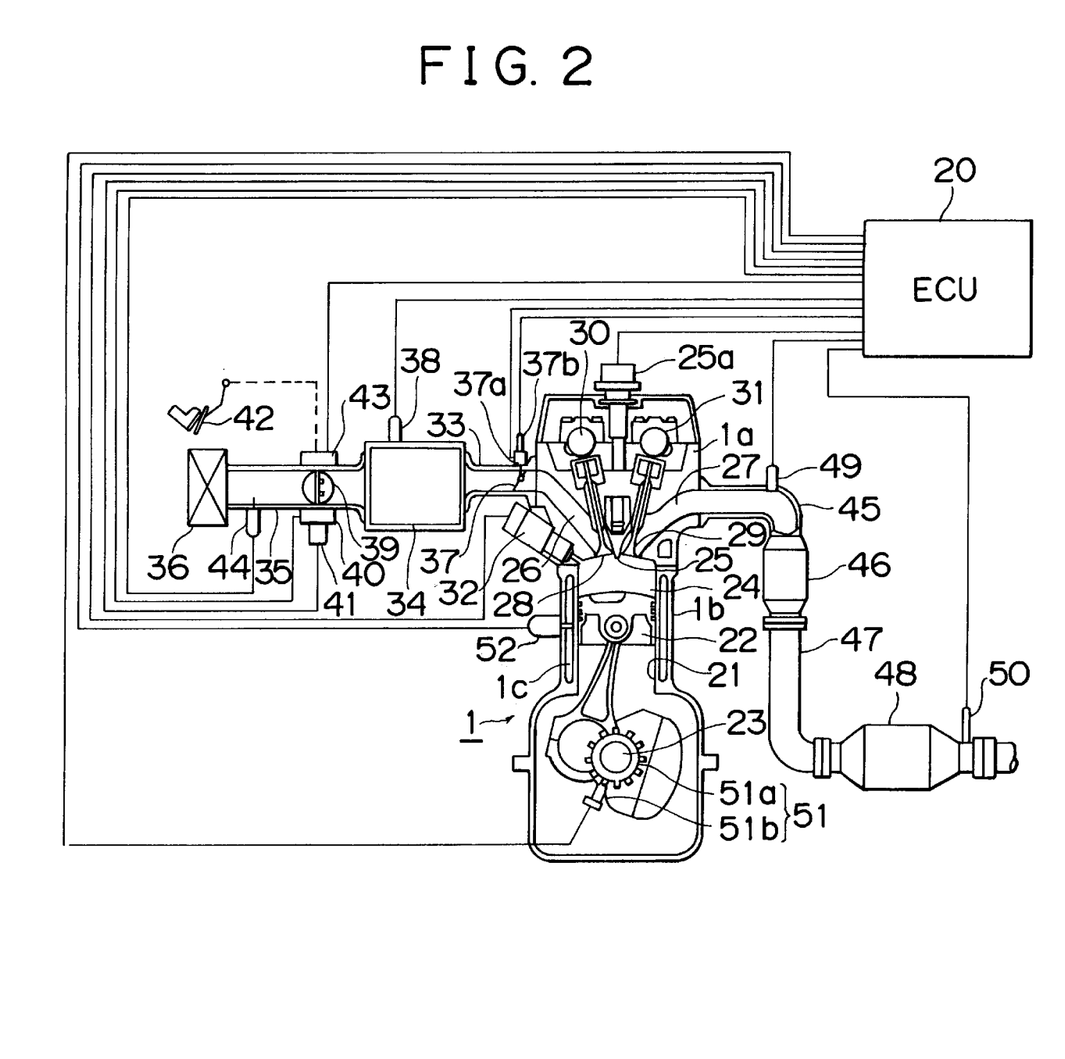
FIG. 2 shows a side view in partial section of a cylinder injection type internal combustion engine.

The internal combustion engine 1, in this example, is a four-stroke cylinder injection gasoline engine equipped with a plurality of cylinders 21, and fuel injection valves 32 for injecting fuel into the individual cylinders 21, as shown in FIG. 2.

The engine 1 has a cylinder block 1b, in which the cylinders 21 and a cooling water passage 1c are formed, and a cylinder head 1a fixed to an upper portion of the cylinder block 1b.

A crankshaft 23, that is, an engine output shaft, is rotatably supported by the cylinder block 1b. The crankshaft 23 is connected to pistons 22 that are slidably disposed in the cylinders 21.

A combustion chamber 24 is defined above each piston 22 by a top surface of the piston 22 and the cylinder head 1a. Spark plugs 25 are mounted to the cylinder head 1a in such a manner that the spark plugs 25 face the corresponding combustion chambers 24. Each spark plug 25 is connected to an igniter 25a for applying a drive current to the spark plug 25.

In the cylinder head 1a, two intake ports 26 and two exhaust ports 27 (with only one port of each type being shown) are formed corresponding to each cylinder 21 in such a manner that the opening ends of the intake ports 26 and the exhaust ports 27 face the combustion chamber 24. Each fuel injection valve 32 is mounted to the cylinder head 1a in such a manner that the injection opening thereof faces the corresponding combustion chamber 24.

The opening ends of the intake and exhaust ports 26, 27 are opened and closed by intake valves 28 and exhaust valves 29, respectively, which are supported by the cylinder head 1a in such a manner that the intake and exhaust valves 28, 29 are movable back and forth. The intake and exhaust valves 28, 29 are driven back and forth by an intake side cam shaft 30 and an exhaust side cam shaft 31 that are rotatably supported by the cylinder head 1a.

The intake side cam shaft 30 and the exhaust side cam shaft 31 are connected to the crankshaft 23 by a timing belt (not shown) so that torque is transmitted from the crankshaft 23 to the intake side cam shaft 30 and the exhaust side cam shaft 31 via the timing belt.

One of the two intake ports 26 connected in communication to the corresponding one of the cylinders 21 is a straight port having a passage that linearly extends from an opening end formed in an outer wall surface of the cylinder head 1a toward the opening end facing the combustion chamber 24. The other intake port 26 is a helical port having a passage that extends from an opening end in the outer wall surface of the cylinder head 1a toward the opening end facing the combustion chamber 24 in a turning manner such that the passage turns with respect to a plane perpendicular to an axis of the cylinder 21.

Each intake port 26 is connected in communication to a corresponding one of branch pipes of an intake manifold 33 mounted to the cylinder head 1a. Each branch pipe connected to a corresponding straight intake port, that is, one of the two intake ports 26 for each cylinder 21, is provided with a swirl control valve 37 for adjusting the flow in the branch pipe. The swirl control valves 37 are provided with an actuator 37a formed by a step motor or the like for opening and closing the swirl control valve 37 in accordance with the current applied thereto, and an SCV (swirl control valve) position sensor 37b for outputting an electric signal corresponding to the present degree of opening of the swirl control valve 37.

The intake manifold (branch pipes) 33 is connected to a surge tank 34. The surge tank 34 is connected to an air cleaner box 36 via an intake pipe 35. A vacuum sensor 38 that outputs an electric signal corresponding to the pressure in the surge tank 34 is mounted to the surge tank 34.

A throttle valve 39 for adjusting the flow in the intake pipe 35 is disposed in the intake pipe 35. The throttle valve 39 is provided with an actuator 40 that is formed by a step motor or the like for opening and closing the throttle valve 39 in accordance with the electric current applied thereto, and a throttle position sensor 41 that outputs an electric signal corresponding to the amount of opening of the throttle valve 39.

The throttle valve 39 is connected to an accelerator lever (not shown) that is turnable in cooperation with an accelerator pedal 42. The accelerator lever is provided with an accelerator position sensor 43 that outputs an electric signal corresponding to the rotational position of the accelerator lever (the amount of depression of the accelerator pedal 42).

Disposed in a portion of the intake pipe 35 upstream of the throttle valve 39 is an air flow meter 44 that outputs an electric signal corresponding to the mass of fresh air flowing in the intake pipe 35 (mass of intake air).

Each exhaust port 27 is connected in communication to a corresponding one of branch pipes of an exhaust manifold 45 mounted to the cylinder head 1a. The exhaust manifold 45 is connected to an exhaust pipe 47 via a first catalyst unit 46. The exhaust pipe 47 is connected at a downstream portion thereof to a muffler (not shown).

A first air-fuel ratio sensor 49 that outputs an electric signal corresponding to the air-fuel ratio of exhaust gas flowing in the exhaust manifold 45 is disposed in the exhaust manifold 45.

A second catalyst unit 48 is provided in partway of the exhaust pip 47. Disposed in a portion of the exhaust pipe 47 downstream of the second catalyst unit 48 is a second air-fuel ratio sensor 50 that outputs an electric signal corresponding to the air-fuel ratio of exhaust gas flowing out of the second catalyst unit 48.

The first catalyst unit 46 is a three-way catalytic converter, having a smaller capacity than the second catalyst unit 48. The second catalyst unit 48 is a three-way catalytic converter, or a NOx occlusion-reduction type catalytic converter, or the like.

The internal combustion engine 1 has a crank position sensor 51 that is substantially made up of a timing rotor 51a mounted to an end portion of the crankshaft 23, and an electromagnetic pickup 51b mounted to a portion of the cylinder block 1b adjacent to the timing rotor 51a. A water temperature sensor 52 is mounted to the cylinder block 1b for detecting the temperature of cooling water flowing in the cooling water passage 1c.

The thus-constructed engine 1 is equipped with an engine controlling electronic control unit (hereinafter, referred to as "engine ECU") 20 made up of electronic circuits including a CPU, a ROM, a RAM and the like. The engine ECU 20 is connected to various sensors, including the SVC position sensor 37b, the vacuum sensor 38, the throttle position sensor 41, the accelerator position sensor 43, the air flow meter 44, the first air-fuel ratio sensor 49, the second air-fuel ratio sensor 50, the crank position sensor 51, the water temperature sensor 52 and the like, via electric wiring.

The engine ECU 20 is also connected to the igniter 25a, the fuel injection valves 32, the actuator 37a, the actuator 40, and the like, via electric wiring.

The engine ECU 20 determines the operating condition of the engine 1 or the like by using the signals from the various sensors as parameters. In accordance with the result of determination, the engine ECU 20 performs various controls on the igniter 25a, the fuel injection valves 32, the actuator 37a, the actuator 40 and the like.

For example, if the engine ECU 20 determines that the operating condition of the engine 1 is in a low load operation range based on the signal from the crank position sensor 51, the accelerator position sensor 43, or the air flow meter 44, the engine ECU 20 performs control to achieve stratified charge combustion. That is, the engine ECU 20 reduces the opening of the swirl control valve 37 by sending a control signal to the actuator 37a, and sets the throttle valve 39 to a substantially fully open state by sending a control signal to the actuator 40. This causes compression stroke fuel injection by applying a drive current to the fuel injection valves 32 of the individual cylinders 21 during their compression strokes.

During the intake stroke of each cylinder 21 in this operation, fresh air is introduced into the combustion chamber 24 mainly from the helical port, so that strong whirling streams (swirls) occur in the combustion chamber 24. In the compression stroke, fuel injected into the combustion chamber 24 from the fuel injection valve 32 turns following the swirls, and moves to the vicinity of the spark plug 25 at a predetermined timing. At this moment, a generally termed stratified state that a combustible mixture layer is formed in the vicinity of the spark plug 25 in the combustion chamber 24 and an air layer is formed in the other region is established in the combustion chamber 24. At the predetermined timing, the engine ECU 20 drives the igniter 25a to ignite the spark plug 25. As a result, the air-fuel mixture (including the combustible mixture layer and the air layer) in the combustion chamber 24 burns starting in the combustible mixture layer adjacent to the spark plug 25. That is, the combustible mixture layer serves as an ignition origin.

The amount of fuel to be injected during the stratified charge combustion operation is determined by using the accelerator pedal depression amount and the engine revolution speed. More specifically, the engine ECU 20 determines an amount of fuel to be injected (or fuel injection duration) by using a fuel injection control map for stratified charge combustion that indicates a relationship among the value of the output signal of the accelerator position sensor 43 (amount of depression of the accelerator pedal), the engine revolution speed and the amount of fuel to be injected (fuel injection amount).

If the engine ECU 20 determines that the operating condition of the engine 1 is in an intermediate load operation range, the engine ECU 20 performs control to achieve uniform lean combustion of a fuel-lean mixture. That is, the engine ECU 20 reduces the opening of the swirl control valve 37 by sensing a control signal to the actuator 37a, and causes intake stroke fuel injection by applying a drive current to the fuel injection valve 32 of each cylinder 21 during the intake stroke of the cylinder 21. In this operation, fresh air and fuel uniformly and homogeneously mix to provide a fuel-lean mixture over substantially the entire combustion chamber 24 of each cylinder 21, thereby achieving uniform lean combustion.

If the engine ECU 20 determines that the operating condition of the engine 1 is in a high load operation range, the engine ECU 20 performs control to achieve uniform combustion of a mixture of an approximately theoretical air-fuel ratio. That is, the engine ECU 20 sets the swirl control valve 37 to the fully open state by sending a control signal to the actuator 37a. The engine ECU 20 then sends a control signal to the actuator 40 such that the throttle valve 39 defines an opening corresponding to the amount of depression of the accelerator pedal 42 (the valve of the output signal of the accelerator position sensor 43), and causes intake stroke fuel injection by applying a drive current to the fuel injection valve 32 of each cylinder 21 during the intake stroke of the cylinder 21. In this operation, fresh air and fuel homogeneously mix to provide a substantially theoretical air-fuel ratio mixture over substantially the entire combustion chamber 24 of each cylinder 21, thereby achieving uniform combustion.

At the transition from the stratified charge combustion control to the uniform combustion control and from the uniform combustion control to the stratified charge combustion control, the engine ECU 20 applies the drive current to the fuel injection valve 32 of each cylinder 21 twice. That is, the engine ECU 20 applies the drive current separately during the compression stroke and during the intake stroke of the cylinder 21 to prevent fluctuation of the torque of the engine 1. In this case, a combustible mixture layer is formed adjacent to the spark plug 25 and a lean mixture layer is formed in the other region in the combustion chamber 24 of each cylinder 21, thus achieving what is generally called weak stratified charge combustion.

If the engine ECU 20 determines that the operating condition of the engine 1 is in an idle operation range, the engine ECU 20 performs generally termed feedback idle speed control (ISC). That is, the engine ECU 20 controls the opening of the throttle valve 39 to secure a flow of intake air that is needed to converge the actual engine revolution speed to a target idle speed.

Referring back to FIG. 1, right and left front wheels 7a, 7b are connected to tie rods 8a, 8b, respectively. The tie rods 8a, 8b are connected to a steering shaft 10 via a steering gear unit 9. An end portion of the steering shaft 10 is connected to a steering wheel 12.

Each of the front and rear wheels 6a, 6b, 7a, 7b is provided with a brake device 13a, 13b, 14a, 14b for braking rotating motion of the wheel. The brake devices 13a, 13b, 14a, 14b are connected to a hydraulic pressure control device 17 by hydraulic passages. In accordance with the hydraulic pressure applied from the hydraulic pressure control device 17, each brake device 13a, 13b, 14a, 14b brakes the corresponding one of the wheels 6a, 6b, 7a, 7b.

Each of the wheels 6a, 6b, 7a, 7b is provided with a wheel speed sensor 15a, 15b, 16a, 16b that is substantially made up of a timing rotor that is rotatable together with the wheel and an electromagnetic pickup disposed adjacent to the timing rotor. Each of the speed sensors 15a, 15b, 16a, 16b outputs an electric signal corresponding to the rotating speed of the corresponding wheel 6a, 6b, 7a, 7b.

The steering shaft 10 is provided with a steering angle sensor 11 that outputs an electric signal corresponding to the steering direction of the steering wheel 12 (the rotational direction of the steering shaft 10) and the steering amount (the rotational angle of the steering wheel 12).

The wheel speed sensors 15a, 15b, 16a, 16b and the steering angle sensor 11 are connected to a behavior controlling ECU 18 by electric wiring. The behavior controlling ECU 18 is connected to various sensors, including an acceleration sensor 53 that outputs an electric signal corresponding to the lateral acceleration of the vehicle body, a yaw rate sensor 54 that outputs an electric signal corresponding to the yaw rate of the vehicle body, and the like, via electric wiring. The behavior controlling ECU 18 is connected to the hydraulic pressure control device 17 by electric wiring, and is also connected to the engine ECU 20 by a communication line.

The automatic transmission 2 is connected to an automatic transmission controlling electronic control unit (hereinafter, referred to as "AT controlling ECU) 19 by electric wiring. The AT controlling ECU 19 is connected to the engine ECU 20 by a communication line.

The behavior controlling ECU 18 determines behavior of the vehicle by using the signals from the various sensors as parameters. In accordance with the result of determination, the behavior controlling ECU 18 controls the hydraulic pressure control device 17, and also performs torque control of the engine 1 via the engine ECU 20.

More specifically, during travel of the vehicle, the behavior controlling ECU 18 calculates actual steered angle of each front wheel 7a, 7b from the value of the output signal of the steering angle sensor 11 and the gear ratio of the steering gear unit 9. The behavior controlling ECU 18 also calculates a travelling speed of the vehicle (vehicle body speed) from the value of the output signal of each wheel speed sensor 15a, 15b, 16a, 16b.

Subsequently, the behavior controlling ECU 18 calculates a reference yaw rate (normative yaw rate) based on the vehicle wheel base, the constant (stability factor) indicating the vehicle intrinsic steering stability, the steered wheel angle, and the vehicle body speed. Furthermore, the behavior controlling ECU 18 inputs the value of the output signal of the yaw rate sensor 54 (actual yaw rate), and subtracts the normative yaw rate from the actual yaw rate to determine a deviation.

If the deviation is a positive value whose absolute valve exceeds an allowable value, that is, if the actual yaw rate is greater than the normative yaw rate and the difference therebetween is greater than the allowable value, the behavior controlling ECU 18 determines that the rear wheels 6a, 6b are losing or likely to lose the grip in comparison with the front wheels 7a, 7b, that is, whether there is an oversteer tendency.

If the deviation of the actual yaw rate is a negative value whose absolute value exceeds an allowable value, that is, the actual yaw rate is smaller than the normative yaw rate and the difference therebetween is greater than the allowable value, the behavior controlling ECU 18 determines that the front wheels 7a, 7b are losing or likely to lose the grip in comparison with the rear wheels 6a, 6b, that is, whether there is an understeer tendency.

If the behavior controlling ECU 18 determines that the vehicle presently has an understeer tendency or an oversteer tendency, the behavior controlling ECU 18 turns on a torque reduction request flag that is provided in the RAM of the engine ECU 20 or the like.

Subsequently, based on whether the vehicle has an understeer tendency or an oversteer tendency, and the magnitude of the absolute value of the deviation of the actual yaw rate from the normative yaw rate (that is, the degree of the understeer or oversteer tendency), the behavior controlling ECU 18 determines which one of the wheels (6a, 6b, 7a, 7b to brake. ECU 18 then calculates an upper limit of the torque of the engine 1.

The behavior controlling ECU 18 then controls the hydraulic pressure control device 17 to apply a hydraulic pressure to the brake device 13a, 13b, 14a, 14b of the wheel 6a, 6b, 7a, 7b that is to be braked. The upper limit value of the torque of the engine 1 is sent as a target torque value to the engine ECU 20.

As for the control of the hydraulic pressure control device 17, the behavior controlling ECU 18 controls the hydraulic pressure control device 17 so as to brake the wheels 6a, 6b, 7a, 7b if the vehicle presently has an understeer tendency. If the vehicle presently has an oversteer tendency, the behavior controlling ECU 18 controls the hydraulic pressure control device 17 so as to brake the outside front wheel 7a or 7b (and the rear wheels 6a, 6b if necessary), that is, the front wheel that is located on an outer side with respect to the turning course of the vehicle.

When the behavior controlling ECU 18 turns on the torque reduction request flag, the engine ECU 20 switches the combustion mode (stratified charge combustion, weak stratified charge combustion, uniform lean combustion, uniform combustion) of the engine 1 to stratified charge combustion (if the combustion mode has been the stratified charge combustion, the engine ECU 20 maintains the stratified charge combustion operation).

Upon receiving the target torque value from the behavior controlling ECU 18, the engine ECU 20 controls the fuel injection amount (amount of fuel to be injected) and the fuel injection timing so that the torque of the engine 1 becomes equal to the target torque value.

In this embodiment, the fuel injection amount during the stratified charge combustion is determined by using the output signal of the accelerator position sensor 43 (the amount of depression of the accelerator pedal) and the engine revolution speed as parameters. Therefore, if the behavior controlling ECU 18 transmits the engine ECU 20 the target torque valve equivalent to the amount of depression of the accelerator pedal, the engine ECU 20 can calculate a fuel injection amount by using the target torque value, the engine revolution speed and the fuel injection amount control map for stratified charge combustion.

Subsequently, the engine ECU 20 determines a fuel injection timing by using the fuel injection amount and the engine revolution speed as parameters, and applies the drive current to the fuel injection valves 32 in accordance with the fuel injection amount and the fuel injection timing.

Since the fuel injection valves 32 inject fuel directly into the cylinders 21, the fuel injection control is immediately reflected in the operation of the engine 1. Thus, the torque of the engine 1 can be finely controlled through adjustment of the fuel injection amount.

Therefore, if the vehicle presently has an understeer tendency, the above-described control brakes the wheels 6a, 6b, 7a, 7b of the vehicle and reduces the torque of the engine 1, so that the vehicle body speed decreases. As a result, the understeer tendency is reduced, and the behavior of the vehicle during the turn stabilizes. If the vehicle presently has an oversteer tendency, the above-described control brakes the outside front wheel 7a or 7b and reduces the torque of the engine 1, so that a moment acting outward with respect to the turning course occurs as well as a reduction in the vehicle body speed. As a result, the oversteer tendency is reduced, and the behavior of the vehicle during the turn stabilizes.

Furthermore, the behavior controlling ECU 18 calculates a slip rate of the inside rear wheel 6a or 6b, If the slip rate exceeds a threshold that is determined on the basis of the vehicle body speed and the steering angle, the behavior controlling ECU 18 predicts that the vehicle will become unstable.

When a rear wheel drive vehicle turns, the loads on the outside front wheel (for example, wheel 7b) and the outside rear wheel (wheel 6b) tend to increase, and the loads on the inside front and rear wheels 7a, 6a, particularly, the load on the inside rear wheel 6a, tend to decrease. Therefore, it is considered that the slip rate of the inside rear wheel 6a will become greater than the slip rates of the other wheels prior to occurrence of an understeer tendency or an oversteer tendency.

Therefore, the behavior controlling ECU 18 predicts that the vehicle will have an understeer tendency or an oversteer tendency if the slip rate of the inside rear wheel 6a or 6b exceeds an allowable value. In such a case, the behavior controlling ECU 18 turns on the torque reduction request flag in the engine ECU 20. In response, the engine ECU 20 immediately changes the combustion mode of the engine 1 to stratified charge combustion.

After that, if the behavior controlling ECU 18 detects that the deviation of the actual yaw rate from the normative yaw rate has exceeded the allowable value, that is, detects that the vehicle behavior has actually changed, the behavior controlling ECU 18 calculates an upper limit torque value and transmits the value to the engine ECU 20. At this moment, the combustion mode of the engine 1 has been switched to stratified charge combustion, so that the engine ECU 20 can immediately perform torque control through fuel injection control.

As can be understood from the foregoing description, the behavior controlling ECU 18 realizes a behavior change detecting device, a behavior change predicting device, and a torque reduction request device according to the invention. The engine ECU 20 realizes an engine operation changing device, and an engine torque control device.

The operation and advantages of the embodiment will be described below.

Figure 3:
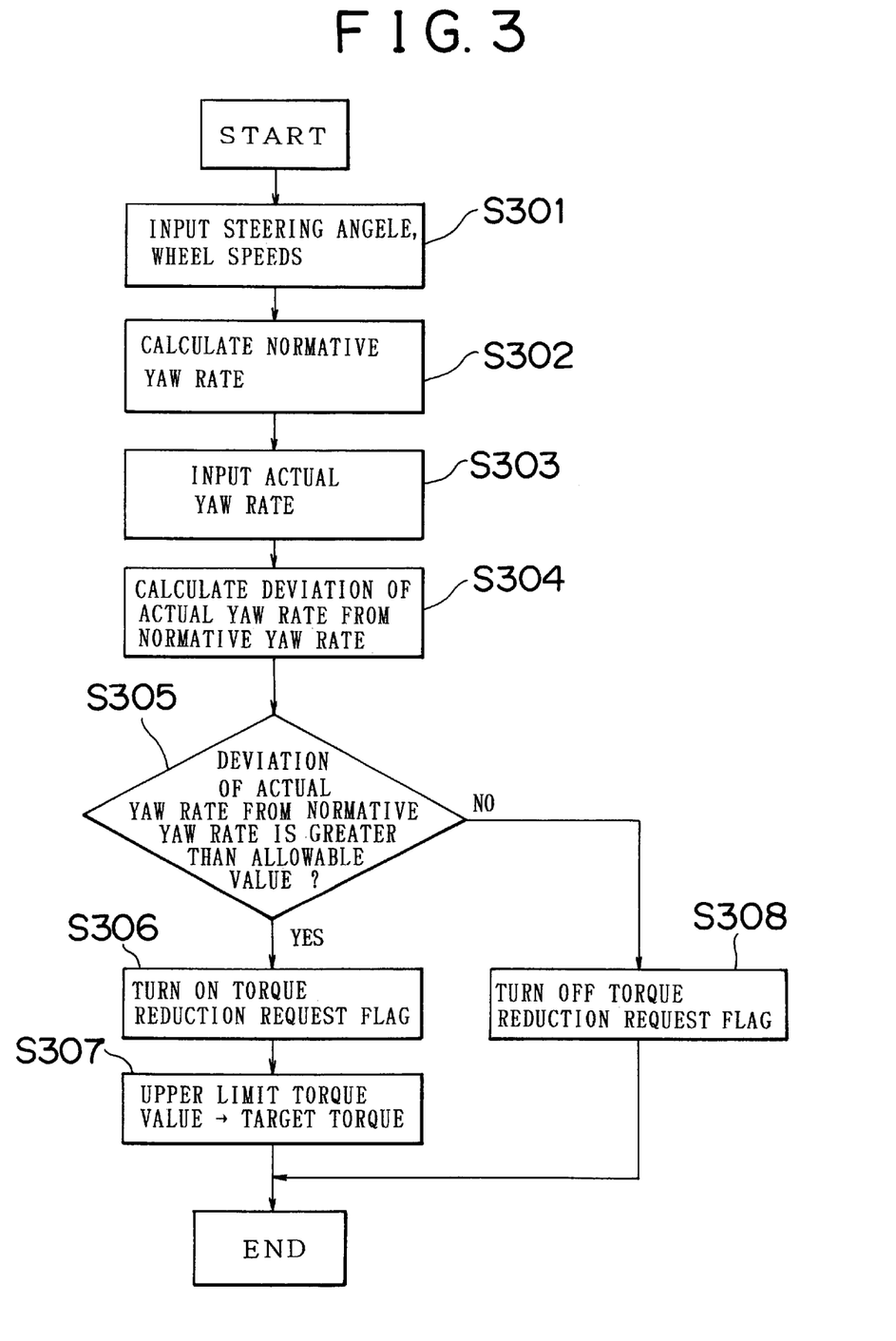
FIG. 3 is a flowchart illustrating a behavior determining routine.
Figure 4:
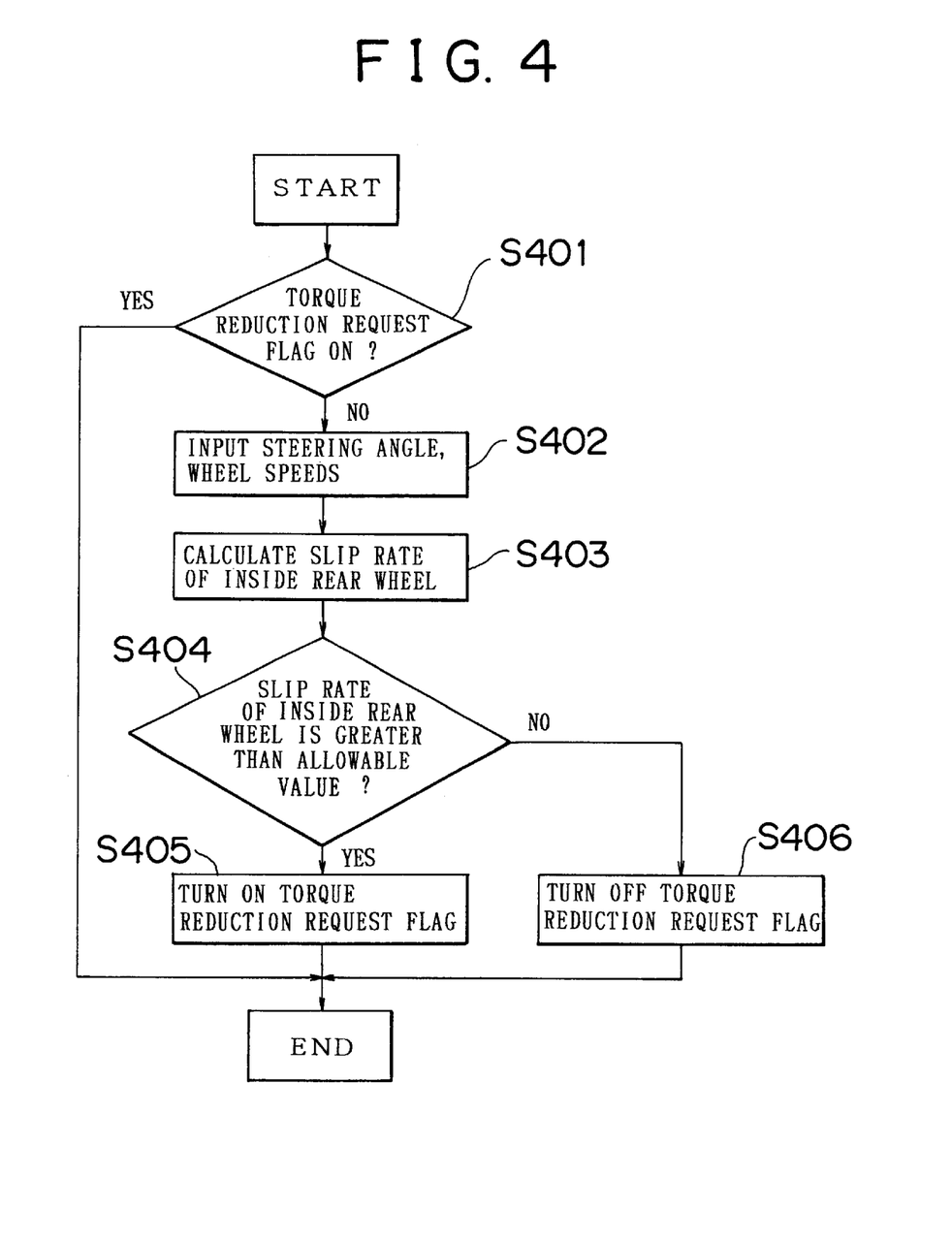
FIG. 4 is a flowchart illustrating a behavior change predicting routine.

The behavior controlling ECU 18 executes a behavior determining routine as illustrated in FIG. 3 and a behavior change predicting routing as illustrated in FIG. 4 in parallel at every predetermined period of time.

In the behavior determining routine, the behavior controlling ECU 18 inputs the output signal of the steering angle sensor 11 and the output signals of the wheel speed sensors 15a, 15b, 16a, 16b in step S301.

Subsequently in step S302, the behavior controlling ECU 18 determining the turning direction of the steering wheel 12 based on the value of the output signal of the steering angle sensor 11, and calculates the steered angle of the front wheels 7a, 7b based on the value of the output signal of the steering angle sensor 11 and the gear ratio of the steering gear unit 9. Subsequently, the behavior controlling ECU 18 calculates a vehicle body speed based on the values of the output signals of the wheel speed sensors 15a, 15b, 16a, 16b. The behavior controlling ECU 18 then reads a pre-stored wheel base value and a pre-stored stability factor from the ROM, and calculates a normative yaw rate from the vehicle body speed, the steered angle, the wheel base value and the stability factor.

In step S303, the behavior controlling ECU 18 inputs the value of the output signal of the yaw rate sensor 54.

In step S304, the behavior controlling ECU 18 calculates a deviation of the actual yaw rate inputted in step S303 from the normative yaw rate calculated in step S302.

Subsequently in step S305, the behavior controlling ECU 18 determines whether the absolute value of the deviation calculated in step S304 is greater than an allowable value.

If it is determined in step S305 that the absolute value of the deviation is not greater than the allowable value, the operation proceeds to step S308, in which the behavior controlling ECU 18 resets (turns off) the torque reduction request flag in the engine ECU 20. After executing the processing in step S308, the behavior controlling ECU 18 temporarily ends the execution of the routine.

Conversely, if it is determined in step S305 that the absolute value of the deviation is greater than the allowable value, the operation proceeds to step S306, in which the behavior controlling ECU 18 turns on the torque reduction request flag in the engine ECU 20. Subsequently in step S307, the behavior controlling ECU 18 calculates an upper limit value of torque of the engine 1 based on the magnitude of the absolute value of the deviation calculated in step S304, and transmits the upper limit torque value as a target torque to the engine ECU 20. After executing the processing in step S307, the behavior controlling ECU 18 temporarily ends the execution of the routine.

In the behavior change predicting routine shown in FIG. 4, the behavior controlling ECU 18 determines in step S401 whether the torque reduction request flag in the engine ECU 20 is on.

If it is determined in step S401 that the torque reduction request flag is on, the behavior controlling ECU 18 temporarily ends the execution of the routine.

Conversely, if it is determined in step S401 that the torque reduction request flag is off, the operation proceeds to step S402. In step S402, the behavior controlling ECU 18 inputs the value of the output signal of the steering angle sensor 11 and the values of the output signals of the wheel speed sensors 15a, 15b, 16a, 16b.

Subsequently in step S403, the behavior controlling ECU 18 calculates an actual vehicle body speed from the values of the output signals of the four wheel speed sensors 15a, 15b, 16a, 16b. Subsequently, the behavior controlling ECU 18 determines which one of the rear wheels 6a, 6b is the inside wheel with respect to the turning course on the basis of the value of the output signal of the steering angle sensor 11. The behavior controlling ECU 18 then calculates a tentative vehicle body speed based on the value of the output signal of the wheel speed sensor 15a or 15b of the rear wheel 6a or 6b. The behavior controlling ECU 18 then divides the value obtained by subtracting the tentative vehicle body speed from the actual vehicle body speed (actual vehicle body speed—tentative vehicle body speed) by the actual vehicle body speed, and multiplies the calculation result ((actual vehicle body speed—tentative vehicle body speed)/actual vehicle body speed) by 100 to determine a slip rate (%).

Subsequently in step S404, the behavior controlling ECU 18 determines whether the slip rate calculated in step S403 is greater than the allowable value.

If it is determined in step S404 that the slip rate is equal to or less than the allowable value (NO), it is considered that no vehicle behavior change will occur, and the operation proceeds to step S406. In step S406, the behavior controlling ECU 18 resets (turns off) the torque reduction request flag in the engine ECU 20. After the processing in step S406, the behavior controlling ECU 18 temporarily ends the execution of the routine.

Conversely, if it is determined in step S404 that the slip rate is greater than the allowable value (YES), the behavior controlling ECU 18 predicts that the vehicle behavior will greatly change, and turns on the torque reduction request flag in the engine ECU 20 in step S405. After the processing in step S405, the behavior controlling ECU 18 temporarily ends the execution of the routine.

Figure 5:
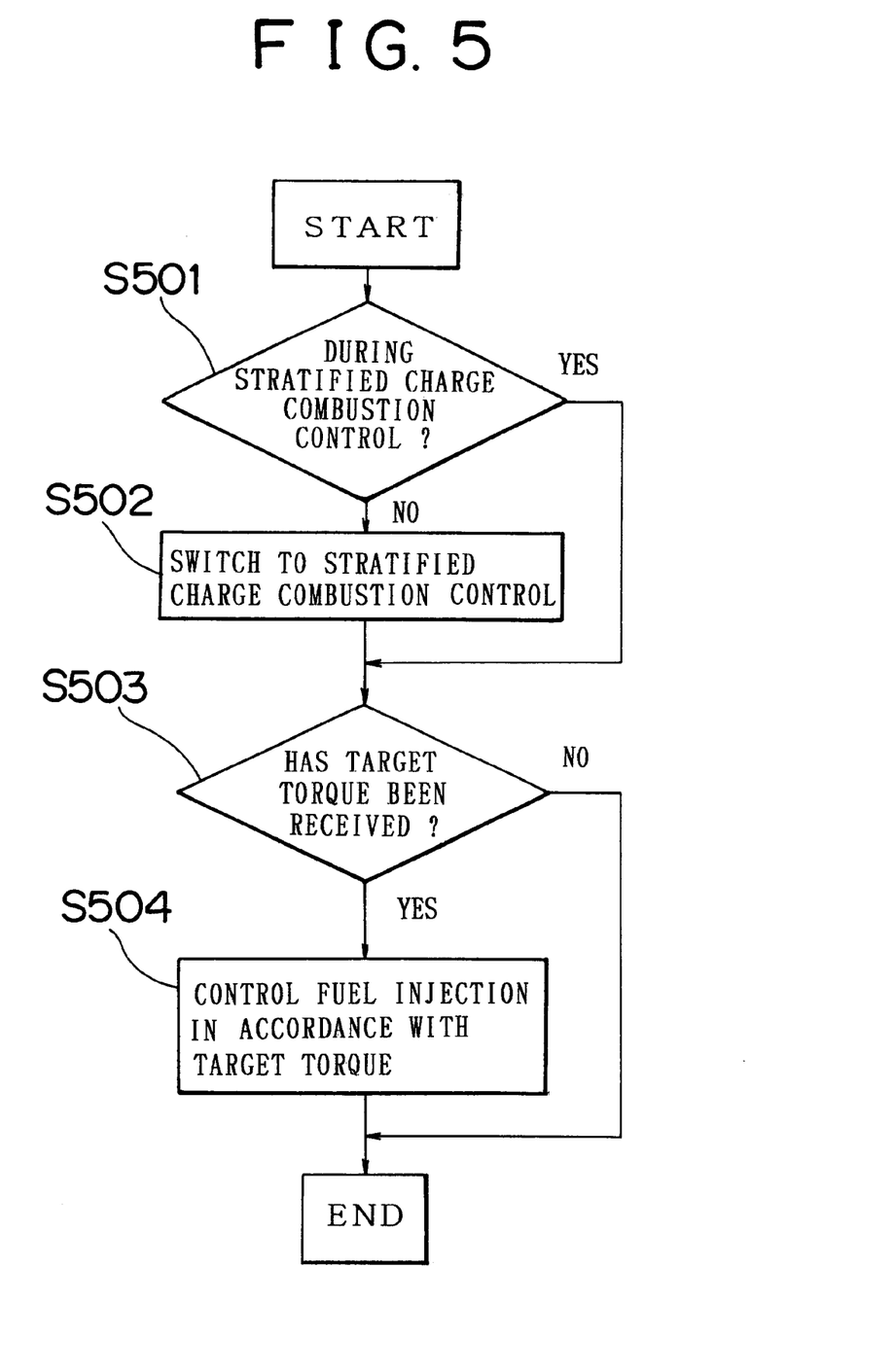
FIG. 5 is a flowchart illustrating a torque control routine.

At the time point when the torque reduction request flag is turned on, the engine ECU 20 executes a torque control routine as illustrated in FIG. 5 as an interrupt operation.

In the torque control routine, the engine ECU 20 determines in step S501 whether the combustion mode of the engine 1 is the stratified charge combustion.

If it is determined in step S501 that the combustion mode of the engine 1 is not the stratified charge combustion, the operation proceeds to step S502, in which the engine ECU 20 switches the combustion mode of the engine 1 to the stratified charge combustion.

Conversely, if it is determined in step S501 that the combustion mode of the engine 1 is the stratified charge combustion, the engine ECU 20 jumps to step S503, without executing step S502.

In step S503, the engine ECU 20 determines whether a target torque value has been received from the behavior controlling ECU 18.

If it is determined in step S503 that a target torque value has been received from the behavior controlling ECU 18, the engine ECU 20 calculates a fuel injection amount by using the engine revolution speed at that time and the target torque value, and determines a fuel injection timing in accordance with the calculated fuel injection amount in step S504. Subsequently, when the value of the output signal of the crank position sensor 51 coincides with the fuel injection timing, the engine ECU 20 applies the drive current to a corresponding one of the fuel injection valves 32.

Since the combustion mode of the engine 1 has been the stratified charge combustion, the control of the fuel injection amount and the fuel injection timing is immediately reflected in the operation of the engine 1, so that the torque of the engine 1 immediately decreases to the target torque.

Conversely, if it is determined in step S503 that a target torque value has not been received from the behavior controlling ECU 18, the engine ECU 20 temporarily ends the execution of the routine.

If the torque reduction request flag is reset from the on status to the off status, the engine ECU 20 ends the interrupt. ECU 20 returns the combustion mode of the engine 1 to a combustion mode suitable to the operating condition of the engine 1, and performs ordinary fuel injection control.

In this embodiment, if a request for a reduction in the torque of the engine 1 is issued to reduce the understeer or oversteer tendency during a turn of a vehicle equipped with a cylinder injection type internal combustion engine, the fuel injection amount and the fuel injection timing are controlled after the combustion mode of the engine 1 is switched to the stratified charge combustion. Therefore, the fuel injection control is immediately reflected in the operation of the engine 1, so that the torque of the engine 1 can be controlled with good responsiveness and the torque can be finely and precisely controlled even in a low load operation range.

Therefore, the embodiment is able to realize torque control with high responsiveness and high precision.

Furthermore, the embodiment predicts a vehicle behavior change based on the slip rate of the inside rear wheel during a turn of the vehicle, and switches the combustion mode of the engine to the stratified charge combustion before performing torque control. Therefore, the embodiment is able to realize torque control with high responsiveness.

Although the embodiment is described above in conjunction with torque control that is performed in response to a torque reduction request flag in order to reduce the understeer or oversteer tendency during a turn of a vehicle, the embodiment is not limited to the above-described control.

For example, if the torque reduction request flag is issued in order to reduce the slip of a drive wheel during acceleration of a vehicle, the torque of the internal combustion engine may be controlled by switching the combustion mode of the engine to the stratified charge combustion and then adjusting the fuel injection amount and the fuel injection timing.

Figure 6:
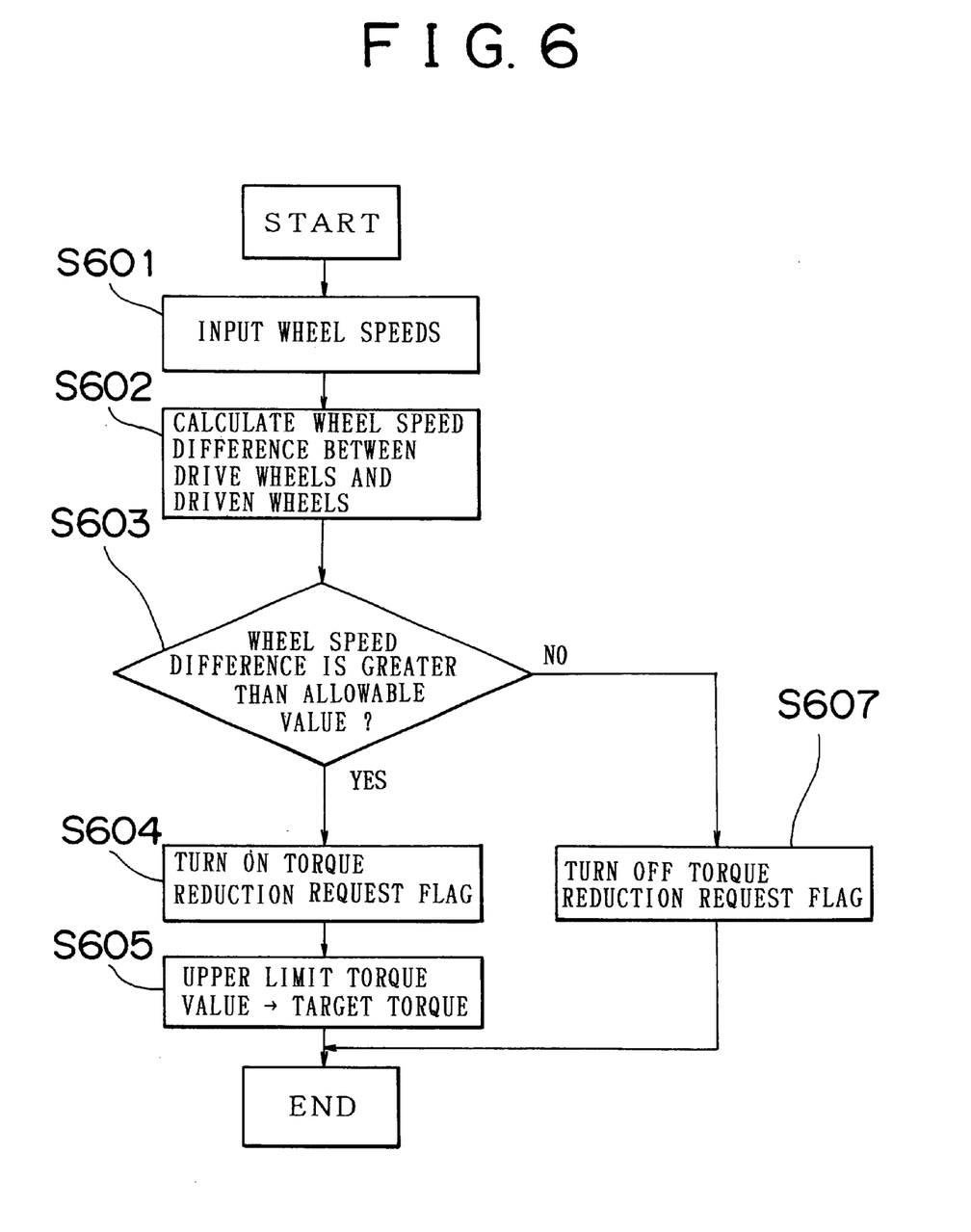
FIG. 6 is a flowchart illustrating a traction control routine.

In this case, the behavior controlling ECU 18 repeatedly executes a traction control routine as illustrated in FIG. 6 at every predetermined period of time.

In the traction control routine, the behavior controlling ECU 18 inputs the values of the output signals of the wheel speed sensors 15*a*, 15*b*, 16*a*, 16*b* of the front and rear wheels 6*a*, 6*b*, 7*a*, 7*b* in step S601.

Subsequently in step S602, the behavior controlling ECU 18 calculates the differences between the values of the output signals of the wheel speed sensors 16*a*, 16*b* of the front wheels 7*a*, 7*b* and the values of the output signals of the wheel speed sensors 15*a*, 15*b* of the rear wheels 6*a*, 6*b*, that is, the wheel speed difference between the driven wheels and the drive wheels.

Subsequently in step S603, the behavior controlling ECU 18 determines whether the wheel speed difference calculated in step S602 is greater than an allowable value.

It if is determined in step S603 that the wheel speed difference is greater than the allowable value (YES), it is considered that an acceleration slip has occurred, and the operation proceeds to step S604. In step S604, the behavior controlling ECU 18 turns on the torque reduction request flag in the engine ECU 20.

In response, the engine ECU 20 performs the torque control routine as illustrated in FIG. 5 as an interrupt, and thereby switches the combustion mode of the engine 1 to the stratified charge combustion.

After executing the processing in step S604, the behavior controlling ECU 18 proceeds to step S605. In step S605, the behavior controlling ECU 18 calculates an upper limit value of torque of the engine 1 based on the magnitude of the wheel speed difference calculated in step S603, and transmits the calculated upper limit torque value as a target torque value to the engine ECU 20. After executing the processing in step S605, the behavior controlling ECU 18 temporarily ends the execution of the routine.

In response, the engine ECU 20 calculates a fuel injection amount based on the target torque value and the engine revolution speed, and determines a fuel injection timing based on the calculated fuel injection amount. In accordance with the fuel injection amount and the fuel injection timing, the engine ECU 20 applies the drive current to the fuel injection valves 32. As the combustion mode of the engine 1 has already been set to the stratified charge combustion, the control of the fuel injection amount and the fuel injection timing is immediately reflected in the operation of the engine 1. So, the torque of the engine 1 immediately decreases to the target torque value.

Conversely, if it is determined in step S603 that the wheel speed difference is equal to or less than the allowable value (NO), it is considered that no acceleration slip has occurred, and the operation proceeds to step S607. In step S607, the behavior controlling ECU 18 resets (turns off) the torque reduction request flag in the engine ECU 20. After executing the processing in step S607, the behavior controlling ECU 18 temporarily ends the execution of the routine.

In a case where a torque reduction request flag is issued to reduce the shock at the time of a speed shift performed by an automatic transmission, it is also possible to control the torque of the internal combustion engine by switching the combustion mode of the engine to the stratified charge combustion and then adjusting the fuel injection amount and the fuel injection timing.

Figure 7:
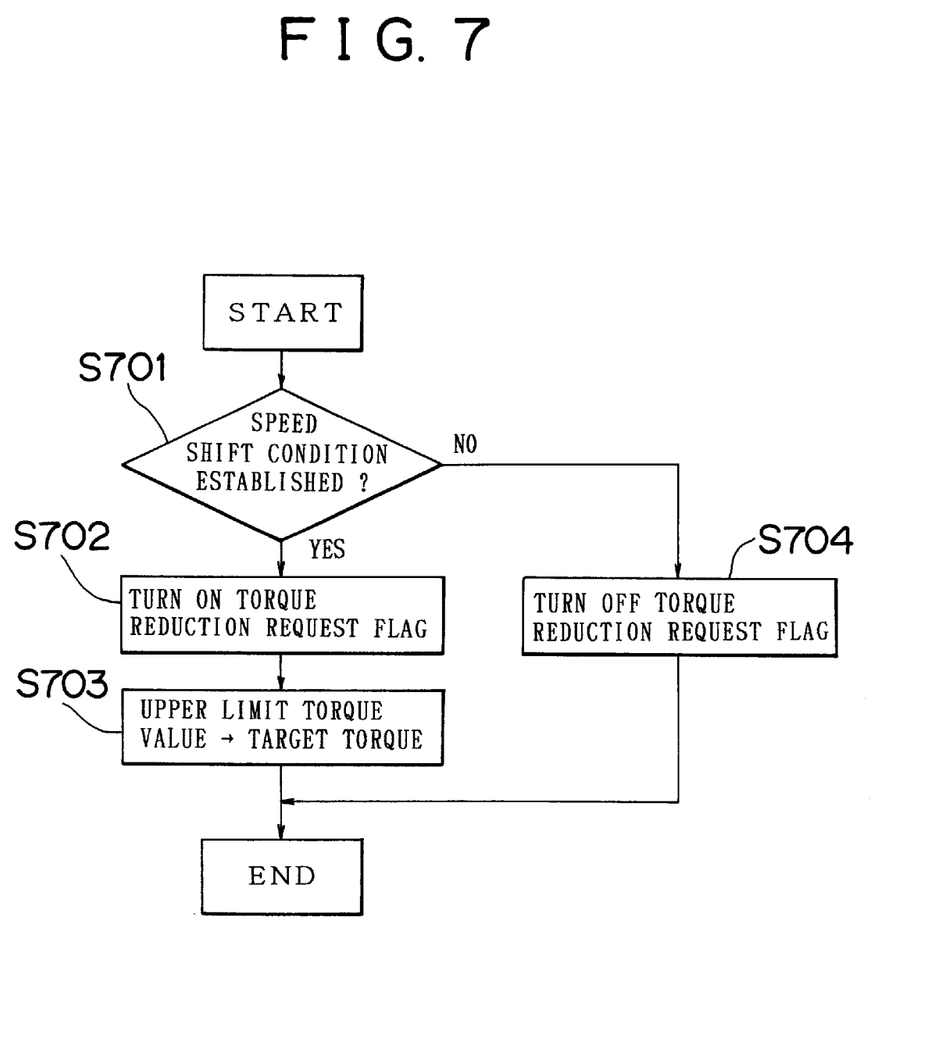
FIG. 7 is a flowchart illustrating a gear speed shift control routine.

In this case, the AT controlling ECU 19 repeatedly executes a speed shift control routine as illustrated in FIG. 7 at every predetermined period of time. In step S701 in the speed shift control routine, the AT controlling ECU 19 inputs various signals, including the signals indicating the throttle opening, the water temperature, the shift position, the automatic transmission fluid temperature, and the like, the then determines whether a condition for a speed shift of the automatic transmission 2 has been established.

If it is determined in step S701 that the speed shift condition is not established, the operation proceeds to step S704, in which the AT controlling ECU 19 resets (turns off) the torque reduction request flag in the engine ECU 20. After executing the processing in step S704, the AT controlling ECU 19 temporarily ends the execution of the routine.

Conversely, if it is determined in step S701 that the speed shift condition has been established, the operation proceeds to step S702, in which the AT controlling ECU 19 turns on the torque reduction request flag in the engine ECU 20.

In response, the engine ECU 20 immediately switches the combustion mode of the engine 1 to the stratified charge combustion.

After executing the processing in step S702, the AT controlling ECU 19 proceeds to step S703, in which the AT controlling ECU 19 calculates a target value of torque of the engine 1, and transmits the target torque value to the engine ECU 20. After executing the processing in step S703, the AT controlling ECU 19 temporarily ends the execution of the routine.

In response, the engine ECU 20 calculates a fuel injection amount by using the target torque value received from the AT controlling ECU 19 and the engine revolution speed as parameters. Using the fuel injection amount as a parameter, the engine ECU 20 calculates a fuel injection timing. In accordance with the fuel injection amount and the fuel injection timing, the engine ECU 20 applies the drive current to the fuel injection valves 32. Since the combustion mode of the engine 1 has already been set to the stratified charge combustion, the control of the fuel injection amount and the fuel injection timing is immediately reflected in the operation of the engine 1, so that the torque of the engine 1 immediately decreases to the target torque value.

As can be understood from the above description, the embodiment is able to perform torque control with high responsiveness and high precision by switching the combustion mode of the internal combustion engine to the stratified charge combustion and then adjusting the fuel injection amount and the fuel injection timing. This can occur when a torque reduction request flag is issued to reduce the slip of a drive wheel during an acceleration of the vehicle, or when a torque reduction request flag is issued to reduce the shock at the time of a speed shift of the automatic transmission.

Although the embodiment is described in conjunction with a cylinder injection type gasoline engine, the invention is not limited to a cylinder injection type gasoline engine, but may also be applied to, for example, a cylinder injection type diesel engine.

Furthermore, although the embodiment is described in conjunction with a cylinder injection type internal combustion engine, the invention is not limited to a type of internal combustion engine in which fuel is directly injected into a cylinder. The invention may also be applied to any other type of engine as long as the combustion mode of the engine can be changed between stratified charge combustion and uniform combustion.

Further, although the embodiment is described in conjunction with a rear wheel drive vehicle, the invention is not limited to such a vehicle. The internal combustion engine control apparatus of the invention is applicable to various other types of vehicles, for example, a front wheel drive vehicle and a four-wheel drive vehicle. The invention is also applicable to a vehicle that employs a continuously variable transmission as an automatic transmission.

While the present invention has been described with reference to what is presently considered to be a preferred embodiment thereof, it is to be understood that the invention is not limited to the disclosed embodiment or constructions. To the contrary, the invention is intended to cover various modifications and equivalent arrangements included within the spirit and scope of the invention.

What is claimed is:

1. An internal combustion engine control apparatus comprising:
    an internal combustion engine that changes between a stratified charge combustion operation and a uniform combustion operation in accordance with an operating condition;
    torque reduction request means for outputting a torque reduction request to the internal combustion engine; and
    engine operation changing means for changing the operation of the internal combustion engine to the stratified charge combustion operation when a torque reduction request for a reduction in torque of the internal combustion engine is outputted irrespective of the operating condition.

2. An internal combustion engine control apparatus according to claim 1, further comprising yaw rate determining means for determining a difference between a detected actual yaw rate of a vehicle body and a reference yaw rate based on a vehicle travelling condition, wherein when the difference is greater than a predetermined value, the torque reduction request is generated.

3. An internal combustion engine control apparatus according to claim 1, further comprising slip rate determining means for determining slip rate of a vehicle wheel, wherein the torque reduction request is generated when a slip rate of a wheel exceeds an allowable value.

4. An internal combustion engine control apparatus according to claim 1, wherein the torque reduction request means outputs a request when a predetermined condition for a speed shift in a vehicle equipped with an automatic transmission is established.

5. An internal combustion engine control apparatus according to claim 1, further comprising engine torque control means for adjusting the torque of the internal combustion engine by changing at least one of an amount of fuel to be injected and a fuel injection timing if the operation of the internal combustion engine is changed to the stratified charge combustion operation by the engine operation.

6. An internal combustion engine control apparatus according to claim 1, further comprising engine torque control means for setting an upper limit of the torque of the internal combustion engine if the operation of the internal combustion engine is changed to the stratified charge combustion operation by the engine operation.

7. An internal combustion engine control apparatus according to claim 1, further comprising braking control means for braking the vehicle if the operation of the internal combustion engine is changed to the stratified charge combustion operation by the engine operation.

8. An internal combustion engine control apparatus comprising:
    an internal combustion engine that changes between a stratified charge combustion operation and a uniform combustion operation in accordance with an operating condition;
    behavior change detecting means for detecting a change in behavior of a vehicle equipped with the internal combustion engine;
    torque reduction request means for outputting a torque reduction request for a reduction in torque of the internal combustion engine, when the behavior change detecting means detects a change in the behavior, in order to reduce the change in the behavior; and
    engine operation changing means for changing the operation of the internal combustion engine to the stratified charge combustion operation when the torque reduction request is outputted by the torque reduction request means irrespective of the operating condition.

9. An internal combustion engine control apparatus according to claim 8, further comprising engine torque control means for adjusting the torque of the internal combustion engine by changing at least one of an amount of fuel to be injected and a fuel injection timing if the operation of the internal combustion engine is changed to the stratified charge combustion operation by the engine operation.

10. An internal combustion engine control apparatus according to claim 8, further comprising behavior change predicting means for predicting a change in the behavior of the vehicle;
    wherein the torque reduction request means outputs the torque reduction request when a change in the behavior of the vehicle is predicted by the behavior change predicting means, and
    wherein the engine operation changing means changes the operation of the internal combustion engine to the stratified charge combustion operation when the torque reduction request is outputted by the torque reduction request means.

11. An internal combustion engine control apparatus according to claim 10, wherein when a slip rate of a wheel exceeds an allowable value, the behavior change predicting means predicts that a change in the behavior will occur.

12. An internal combustion engine control apparatus according to claim 8, wherein the behavior change detecting means detects a change in the behavior on the basis of a detected actual yaw of a vehicle body and a reference yaw rate determined by a vehicle travelling condition.

13. An internal combustion engine control apparatus according to claim 8, wherein the behavior change detecting means detects a change in the behavior when a slip rate of a wheel exceeds an allowable value.

14. An internal combustion engine control apparatus according to claim 8, wherein the behavior change detecting means detects a change in the behavior when a predetermined condition for a speed shift in a vehicle equipped with an automatic transmission is established.

15. An internal combustion engine control apparatus according to claim 8, further comprising engine torque control means for setting an upper limit of torque of the internal combustion engine if the operation of the internal combustion engine is changed to the stratified charge combustion operation by the engine operation.

16. An internal combustion engine control apparatus according to claim 8, further comprising braking control means for braking the vehicle when the operation of the internal combustion engine is changed to the stratified charge combustion operation by the engine operation.

17. A method of controlling a vehicle engine, comprising the steps of:

changing between stratified charge combustion operation and uniform combustion operation in accordance with an operating condition;

receiving input vehicle behavior signals, including steering angle signals, wheel speed signals, and yaw rate signals;

generating a torque reduction request based on the input vehicle behavior signals; and adjusting engine combustion operation between stratified charge combustion and uniform combustion to adjust the torque of the engine based on the torque reduction request irrespective of the operating condition.

18. The method of claim 17, further comprising the steps of:

determining a deviation in yaw rate based on input yaw rate and a normative yaw rate established from input behavior signals; and comparing the deviation in yaw rate to a preset yaw rate value, wherein the step of generating the torque reduction request is based on the comparison in yaw rates.

19. The method of claim 17, further comprising the steps of:

determining a slip rate based on input vehicle behavior signals; and comparing the determined slip rate to a preset slip rate value, wherein the step of generating the torque reduction request is based on the comparison in slip rates.

20. The method of claim 17, further comprising the steps of:

determining wheel speed difference between drive wheels and driven wheels; and comparing the determined wheel speed difference to a preset wheel speed value, wherein the step of generating the torque reduction request is based on the comparison in wheel speed values.

21. The method of claim 17, further comprising the step of:

determining a speed shift condition of the engine, wherein the step of generating the torque reduction request is based on the determined speed shift condition.

22. The method of claim 17, further comprising controlling the torque when a torque reduction is requested, including:

determining the combustion operation and changing the operation to stratified charge combustion when the combustion operation is determined to be uniform combustion;

establishing a target torque value and determining whether the target torque value has been output and determining a fuel injection amount and a fuel injection timing based on the target torque value when the target torque value has been output.

* * * * *